US012620904B2

(12) United States Patent
Chen

(10) Patent No.: US 12,620,904 B2
(45) Date of Patent: May 5, 2026

(54) POWER CONVERSION CIRCUIT

(71) Applicant: LITE-ON TECHNOLOGY CORPORATION, Taipei (TW)

(72) Inventor: Guan-Lun Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 214 days.

(21) Appl. No.: 18/539,312

(22) Filed: Dec. 14, 2023

(65) Prior Publication Data

US 2024/0305209 A1     Sep. 12, 2024

(30) Foreign Application Priority Data

Mar. 7, 2023    (TW) ................................. 112108262

(51) Int. Cl.
H02M 3/335          (2006.01)
H02M 1/32           (2007.01)

(52) U.S. Cl.
CPC ......... H02M 3/33584 (2013.01); H02M 1/32 (2013.01); H02M 3/33573 (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233;

H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | | |
|---|---|---|---|---|
| 5,615,094 A | * | 3/1997 | Cosentino | ............... H02M 1/34 |
| | | | | 363/56.12 |
| 9,584,028 B2 | * | 2/2017 | Shteynberg | ........ H05B 45/3725 |
| 9,923,474 B2 | * | 3/2018 | Matsushita | ....... H02M 3/33561 |
| 2008/0285311 A1 | * | 11/2008 | Aso | ................... H02M 3/33571 |
| | | | | 363/21.01 |
| 2022/0294345 A1 | * | 9/2022 | Hosoi | ................... H02M 1/342 |

FOREIGN PATENT DOCUMENTS

CN          115085554 A      9/2022

OTHER PUBLICATIONS

Office action issued by TIPO dated Sep. 4, 2023.

* cited by examiner

*Primary Examiner* — Jeffrey A Gblende
(74) *Attorney, Agent, or Firm* — WPAT, PC

(57)                ABSTRACT
A power conversion circuit, includes the following elements. A first transformer, comprising a first winding coil and a second winding coil. A primary side circuit, connected to the first winding coil, the primary side circuit comprising a first power supply and a plurality of first switching units. A secondary side circuit, connected to the second winding coil, the secondary side circuit comprises a second power supply, a plurality of second switching units and a coupling circuit. When one of the first switching units and the second switching units generates a surge voltage, a surge energy associated with the surge voltage is guided to the second power supply through the coupling circuit.

15 Claims, 6 Drawing Sheets

POWER CONVERSION CIRCUIT

This application claims the benefit of Taiwan application Serial No. 112108262, filed Mar. 7, 2023, the disclosure of which is incorporated by reference herein in its entirety.

TECHNICAL FIELD

The disclosure relates to a conversion circuit, and in particular to a power conversion circuit

BACKGROUND

With the evolution of the technology of emerging energy sources, various energy storage systems have been widely used. For example, electric vehicles or battery cabinets both have energy storage systems. When the energy storage system performs reverse energy releasing to return power to the grid, the power conversion circuit in the energy storage system operates in a reverse boost mode. In the boost mode, when an abnormality occurs in the energy storage system and the operation must be stopped immediately, the switching elements in the power conversion circuit immediately stop and the switching elements are immediately disconnected.

FIG. 1 is a circuit diagram of a power conversion circuit 2000 in the prior art. FIG. 1 only shows a secondary side circuit 2020 of the power conversion circuit 2000. The transformer 200 has a primary side winding coil P1 and a secondary side winding coil P2. The secondary side circuit 2020 is connected to the secondary side winding coil P2 of the transformer 200. The secondary side circuit 2020 comprises transistors Q1-Q4, a capacitor C2 and a second power supply 400. Transistors Q1-Q4 serve as switching elements. When an abnormality occurs in the energy storage system, the transistors Q1-Q4 are immediately disconnected, causing an instantaneous change in current, and the inductor L1 will generate a huge surge voltage. A surge energy associated with the surge voltage may damage transistors Q1-Q4.

In order to reduce the surge energy associated with the surge voltage, the power conversion circuit 2000 in the prior art is further provided with a snubber circuit 600 to absorb the surge energy. The damping circuit 600 comprises a diode D01, a capacitor C01 and a resistor R01. When the snubber circuit 600 is operating, the diode D01 is turned on and absorbs the surge energy through the capacitor C01. However, since resistor R01 consumes power during normal operation, losses will occur.

In response to the above-mentioned technical problems of the prior art, it is necessary to improve or replace the existing snubber circuit, so that the surge energy can be recovered and the loss can be reduced.

SUMMARY

According to one embodiment, the power conversion circuit includes the following elements. A first transformer, comprising a first winding coil and a second winding coil. A primary side circuit, connected to the first winding coil, the primary side circuit comprising a first power supply and a plurality of first switching units. A secondary side circuit, connected to the second winding coil, the secondary side circuit comprises a second power supply, a plurality of second switching units and a coupling circuit. When one of the first switching units and the second switching units generates a surge voltage, a surge energy associated with the surge voltage is guided to the second power supply through the coupling circuit.

Figure 1:
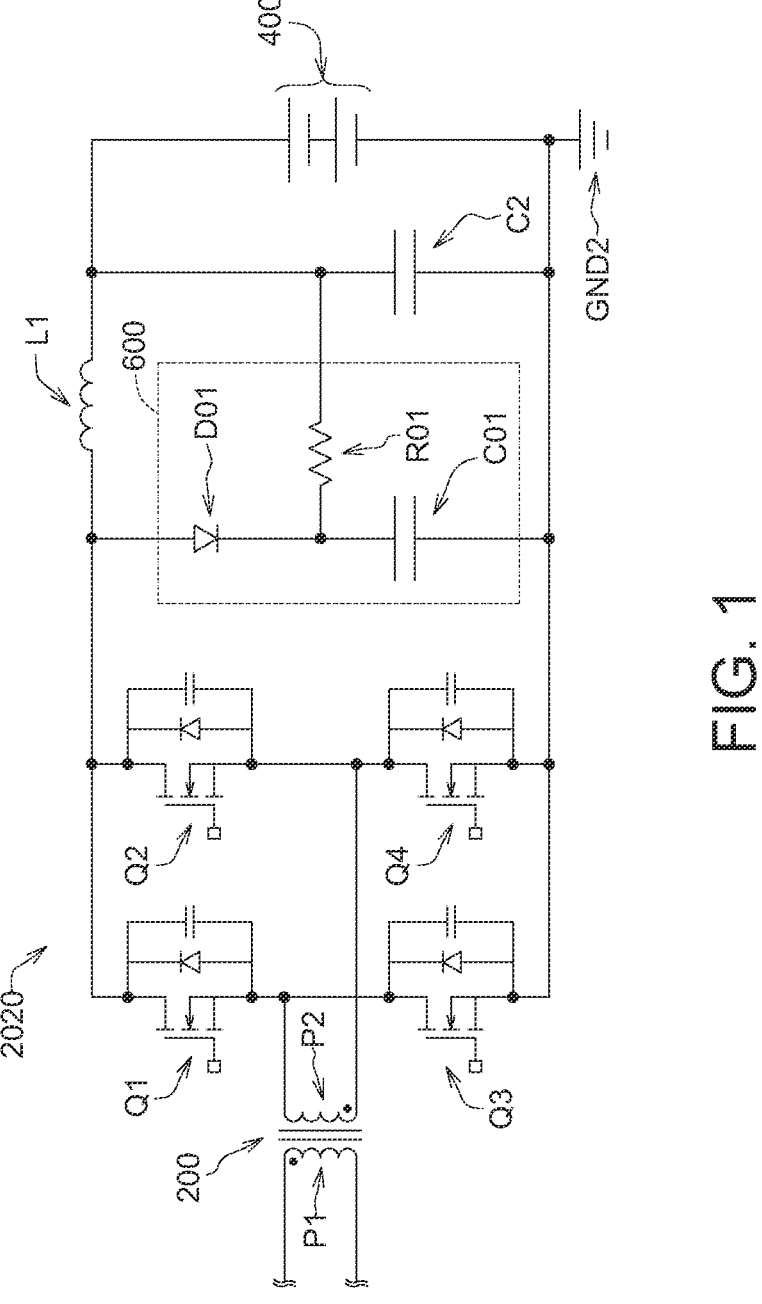
FIG. 1 is a circuit diagram of a power conversion circuit 2000 in the prior art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2A:
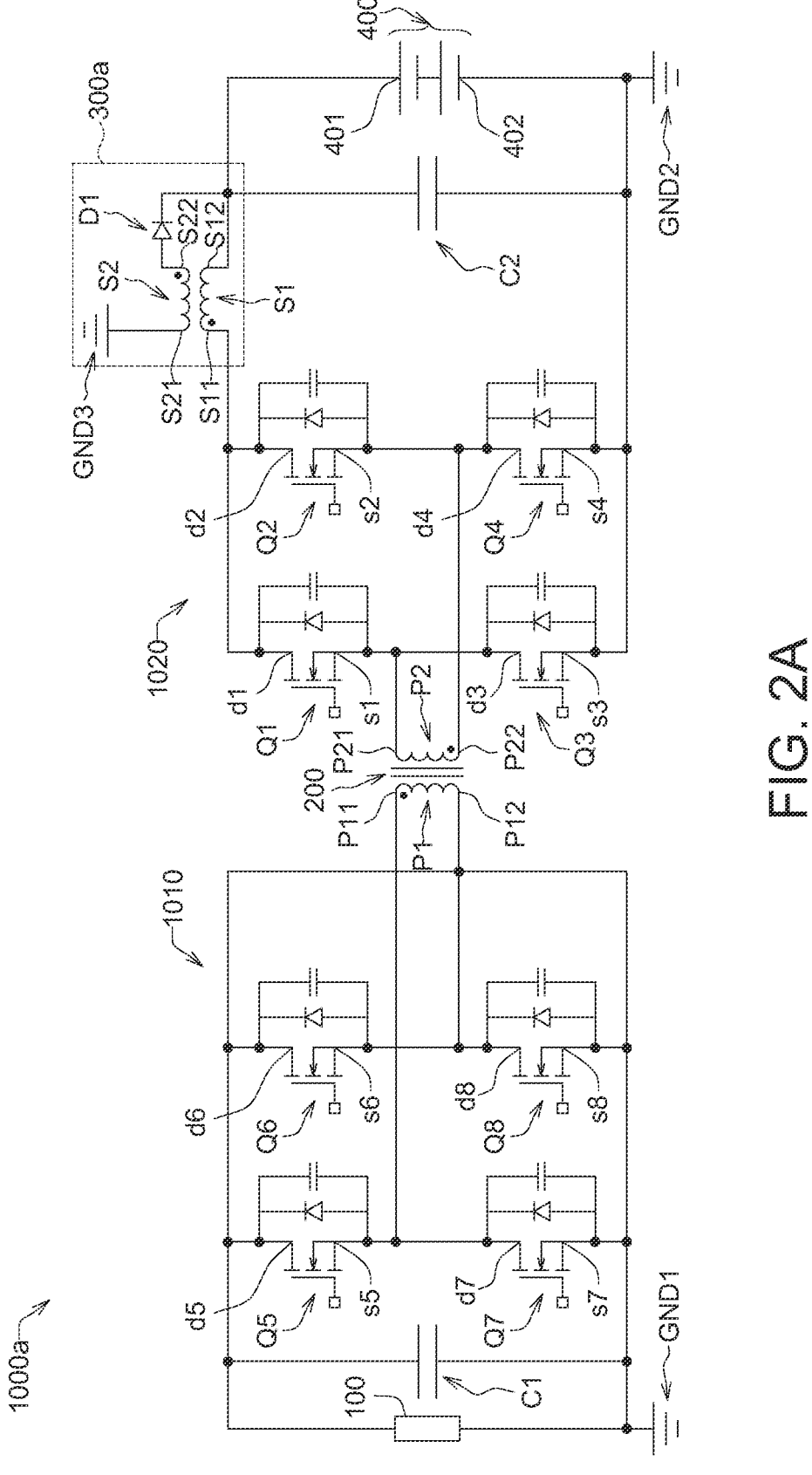
FIG. 2A is a circuit diagram of a power conversion circuit 1000*a* according to an embodiment of the disclosure.

FIG. 2A is a circuit diagram of a power conversion circuit 1000*a* according to an embodiment of the disclosure. As shown in FIG. 2A, the power conversion circuit 1000*a* comprises a primary side circuit 1010, a secondary side circuit 1020 and a transformer 200. The primary side circuit 1010 is electrically isolated from the secondary side circuit 1020 through the transformer 200. The transformer 200 comprises a winding coil P1 and a winding coil P2. The winding coil P1 is disposed on the primary side of the transformer 200 and the winding coil P2 is disposed on the secondary side of the transformer 200. The winding coil P1 and the winding coil P2 have a turns ratio TNP_R. The turns ratio TNP_R is: the number of turns TNP2 of the winding coil P2 divided by the number of turns TNP1 of the winding coil P1. When the turns ratio TNP_R is greater than "1", the primary side of the transformer 200 is a high voltage side and the secondary side is a low voltage side. When the turns ratio TNP_R is less than "1", the primary side of the transformer 200 is the low voltage side and the secondary side is the high voltage side. According to different values of the turns ratio TNP_R, the primary side circuit 1010 is associated with the low voltage side or the high voltage side, and the secondary side circuit 1020 is associated with the high voltage side or the low voltage side.

The primary side circuit 1010 comprises a first power supply 100, a capacitor C1 and four transistors Q5-Q8. One end of the first power supply 100 is connected to the drain d5 of the transistor Q5, and the other end of the first power supply 100 is connected to the source s7 of the transistor Q7 and the ground end GND1. The capacitor C1 is connected to the first power supply 100 in parallel. One end of the capacitor C1 is connected to the drain d5 of the transistor Q5, and the other end of the capacitor C1 is connected to the source s7 of the transistor Q7 and the ground end GND1.

Each of the transistors Q5-Q8 can be used as a switching unit, which has the function of a switch. Each of the transistors Q5-Q8 can be referred to as a "first switching unit". In one example, the transistors Q5-Q8 are connected to the primary side winding coil P1 in a full-bridge configuration. The connection method of the full-bridge configuration of transistors Q5-Q8 is as follows: the source s5 of transistor Q5 and the drain d7 of transistor Q7 are connected to the first end P11 of the winding coil P1, and the source s6 of transistor Q6 and the drain d8 of the transistor Q8 is connected to the second end P12 of the winding coil P1. The transistors Q5-Q8 perform switching functions according to the full-bridge configuration, so to achieve the purpose of rectifying the power provided by the first power supply 100.

On the other hand, the secondary side circuit 1020 comprises a second power supply 400, a capacitor C2, four transistors Q1-Q4, and a coupling circuit 300a. The first end 401 of the second power supply 400 serves as the output end of the second power supply 400, and the first end 401 is connected to the drain d2 of the transistor Q2 through the coupling circuit 300a. The second end 402 of the second power supply 400 is connected to the source s4 of the transistor Q4 and the ground end GND2. The capacitor C2 is connected with the second power supply 400 in parallel. One end of the capacitor C2 is connected to the drain d2 of the transistor Q2 through the coupling circuit 300a, and the other end of the capacitor C2 is connected to the source s4 of the transistor Q4 and the ground end GND2.

Similar to the transistors Q5-Q8 of the primary side circuit 1010, each of the transistors Q1-Q4 of the secondary side circuit 1020 can be used as a switching unit, which has the function of switching. Each of the transistors Q1-Q4 One can be referred to as the "second switching unit". In one example, the transistors Q1-Q4 are connected to the winding coil P2 on the secondary side in a full-bridge configuration. The connection method of the full-bridge configuration of transistors Q1-Q4 is as follows: the source s1 of transistor Q1 and the drain d3 of transistor Q3 are connected to the first end P21 of the winding coil P2, and the source s2 of transistor Q2 and the drain d4 of the transistor Q4 is connected to the second end P22 of the winding coil P2. The transistors Q1-Q4 perform switching functions according to the full-bridge configuration, so as to rectify the power provided by the winding coil P2 on the secondary side.

In the reverse boost mode of the power conversion circuit 1000a, when an abnormality occurs in the system and the operation must be stopped immediately. The transistors Q1-Q4 and transistors Q5-Q8, that function as switches, are changed from turned-on state to turned-off state in a very short time and cause a surge voltage in the cross voltage of the winding coil S1 of the secondary circuit 1020 and a surge voltage in the cross voltage between the drain d2 of the transistor Q2 and the source d4 of the transistor Q4. Surge energy associated with the surge voltage may cause damage to transistors Q1-Q4 and transistors Q5-Q8. In order to reduce the negative impact of the surge voltage, the coupling circuit 300a is used to guide the surge energy associated with the surge voltage, such that the surge energy is guided to the second power supply 400 and the second power supply 400 can recover the surge energy.

Figure 2B:
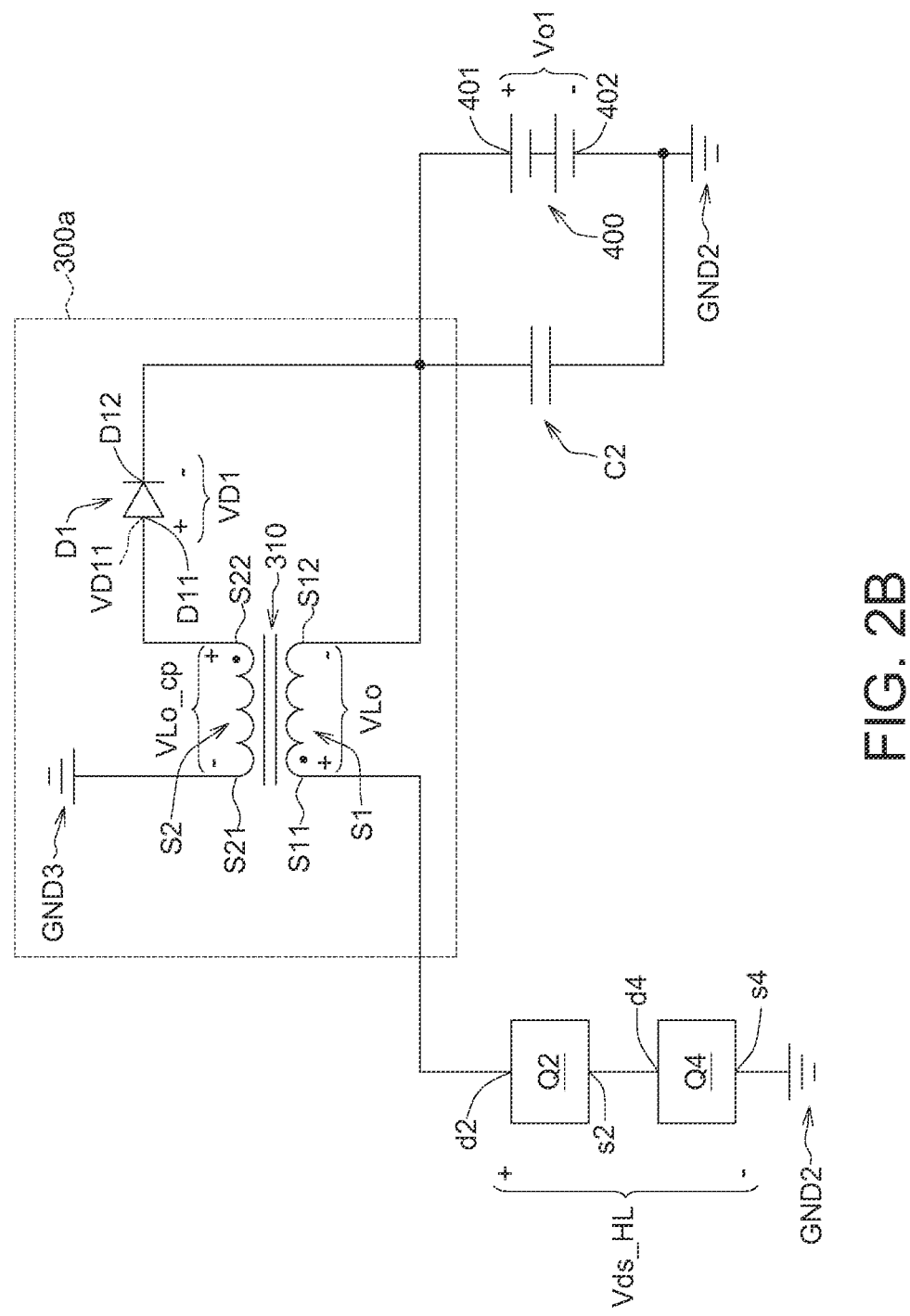
FIG. 2B is a detailed circuit diagram of the coupling circuit 300*a* of FIG. 2A.

FIG. 2B is a detailed circuit diagram of the coupling circuit 300a of FIG. 2A. Please refer to FIGS. 2A and 2B, the coupling circuit 300a comprises a winding coil S1, a winding coil S2 and a rectifying element. The rectifying element is, for example, a diode D1. The winding coil S1 and the winding coil S2 form a transformer 310. The winding coil S1 is disposed on the primary side of the transformer 310, and the winding coil S2 is disposed on the secondary side of the transformer 310. The winding coil S1 and the winding coil S2 have a turns ratio TNS_R. The turns ratio TNS_R is: the number of turns TNS2 of the winding coil S2 divided by the number of turns TNS1 of the winding coil S1. On the other hand, the diode D1 serves as a rectifying element to control the direction of the output current of the secondary side winding coil S2.

The first end S11 of the winding coil S1 is connected to the drain d2 of the transistor Q2, and the second end S12 of the winding coil S1 is connected to one end of the capacitor C2 and the first end 401 of the second power supply 400. On the other hand, the first end S21 of the winding coil S2 is connected to the ground end GND3, and the second end S22 of the winding coil S2 is connected to one end of the capacitor C2 and the first end 401 of the second power supply 400 through the diode D1. The second end S22 of the winding coil S2 is connected to the anode D11 of the diode D1, and the cathode D12 of the diode D1 is connected to one end of the capacitor C2 and the first end 401 of the second power supply 400.

The cross voltage between the first end 401 and the second end 402 of the second power supply 400 is the voltage difference Vo1, and the cross voltage between the first end S11 and the second end S12 of the winding coil S1 is the voltage difference VLo. Furthermore, the cross voltage between the drain d2 of the transistor Q2 and the source d4 of the transistor Q4 is the voltage difference Vds_HL. The voltage difference Vds_HL is equal to the sum of the voltage difference Vo1 of the second power supply 400 and the voltage difference VLo of the winding coil S1. Furthermore, there is a forward bias voltage VD1 between the anode D11 and the cathode D12 of the diode D1.

In operation, when an abnormality occurs in the system and the transistors Q1-Q4 and transistors Q5-Q8 change to turned-off state in a very short time, it will cause the current to change instantaneously, resulting in a surge voltage in the cross voltage of the winding coil S1, and the surge voltage is reflected in the voltage difference VLo between the first end S11 and the second end S12 of the winding coil S1. It will cause a surge voltage in the cross voltage between the drain d2 of the transistor Q2 and the source d4 of the transistor Q4, and this surge voltage is reflected in the voltage difference Vds_HL between drain d2 and source d4.

Furthermore, the voltage difference VLo (having a surge voltage) of the winding coil S1 is coupled to the winding coil S2 on the secondary side, and a voltage difference VLo_cp is generated between the first end S21 and the second end S22 of the winding coil S2. The voltage difference VLo_cp of the winding coil S2 is equal to a product of the voltage difference VLo of the winding coil S1 and the turns ratio TNS_R. Since the first end S21 of the winding coil S2 is connected to the ground end GND3, a potential of the anode D11 of the diode D1 is equal to the voltage difference VLo_cp between the second end S22 and the first end S21 of the winding coil S2, as shown in Equation (1):

$$VD11 = VLo\_cp = VLo \times TNS\_R \qquad (1)$$

When the potential of the anode D11 of the diode D1 is greater than the sum of the forward bias voltage VD1 of the diode D1 and the voltage difference Vo1 of the second power supply 400, the diode D1 is in a turned-on state, and the surge energy associated with the surge voltage can be guided to the second power supply 400 through the diode D1, so that the second power supply 400 can recover the surge energy. When a product of the voltage difference VLo of the winding coil S1 and the turns ratio TNS_R meets the predefined condition, the potential VD11 of the anode D11 of the diode D1 reaches a sufficient potential so that the diode D1 is turned on and can guide the surge energy. The predefined condition to turn on the diode D1 is shown as Equation (2):

$$VLo\_cp = VLo \times TNS\_R = VD11 > VD1 + Vo1 \qquad (2)$$

In order to turned on the diode D1 to guide the surge energy, the turns ratio TNS_R of the winding coil S1 and the winding coil S2 is set according to Equation (3):

$$TNS\_R > \frac{VD1 + Vo1}{VLo} \qquad (3)$$

A first value can be defined in Equation (3), where the first value is equal to the sum of the forward bias voltage VD1 of the diode D1 and the voltage difference Vo1 of the second power supply 400 divided by the voltage difference VLo of the third winding coil S1. The first value is smaller than the turns ratio TNS_R of the winding coil S1 and the winding coil S2.

Figure 3A:
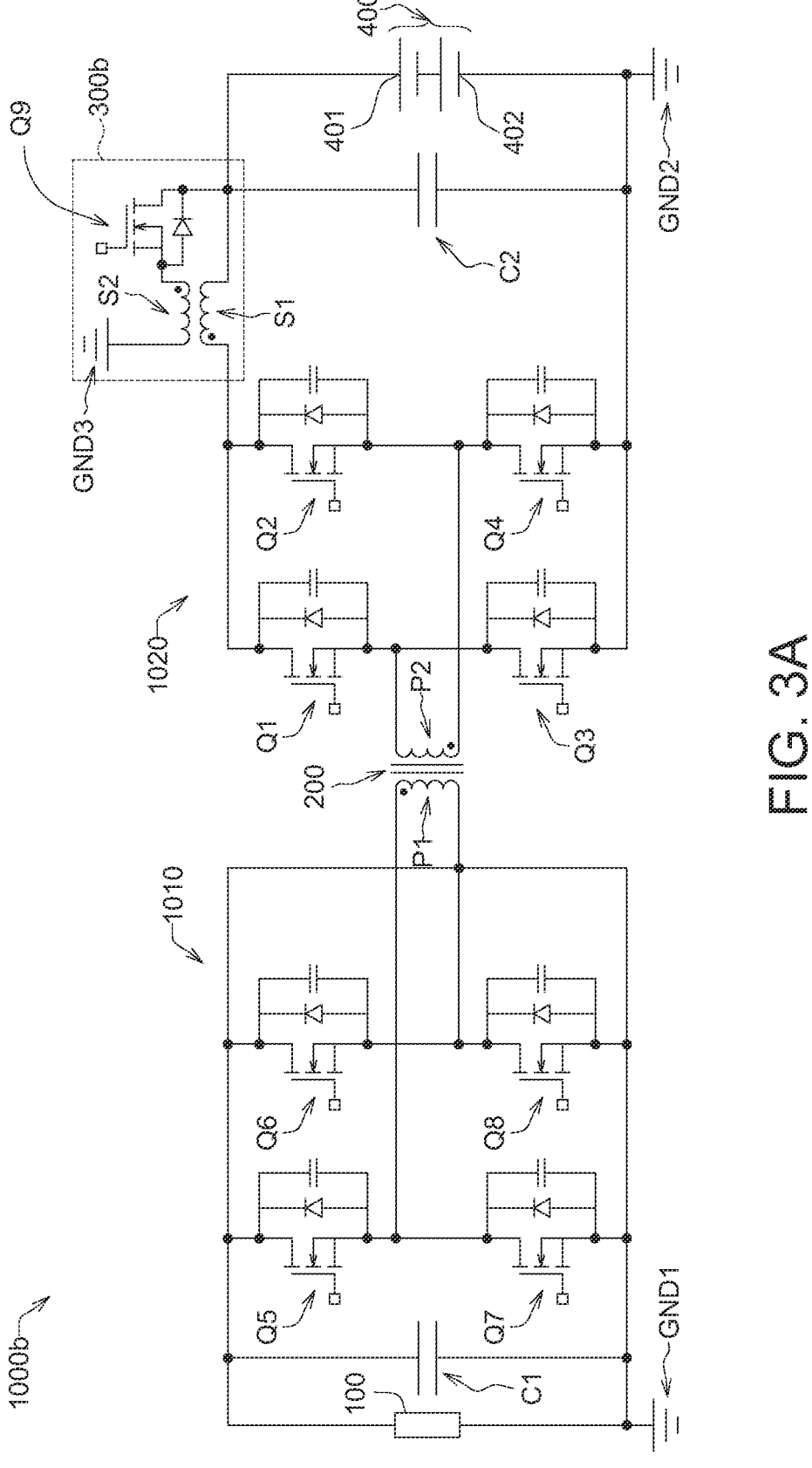
FIG. 3A is a circuit diagram of a power conversion circuit 1000*b* according to another embodiment of the disclosure.

FIG. 3A is a circuit diagram of a power conversion circuit 1000b according to another embodiment of the disclosure. The power conversion circuit 1000b of FIG. 3A is similar to the power conversion circuit 1000a of FIG. 2A, and the difference lies in that, the coupling circuit 300b of the power conversion circuit 1000b of FIG. 3A comprises a different form of rectifying element. The rectifying element of coupling circuit 300b is replaced by transistor Q9. The transistor Q9 can be used as a switching unit having a function of switching. The transistor Q9 can be referred to as "the third switching unit". The transistor Q9 serves as a rectifier element to control the current output of the winding coil S2 on the secondary side of the transformer 310.

Figure 3B:
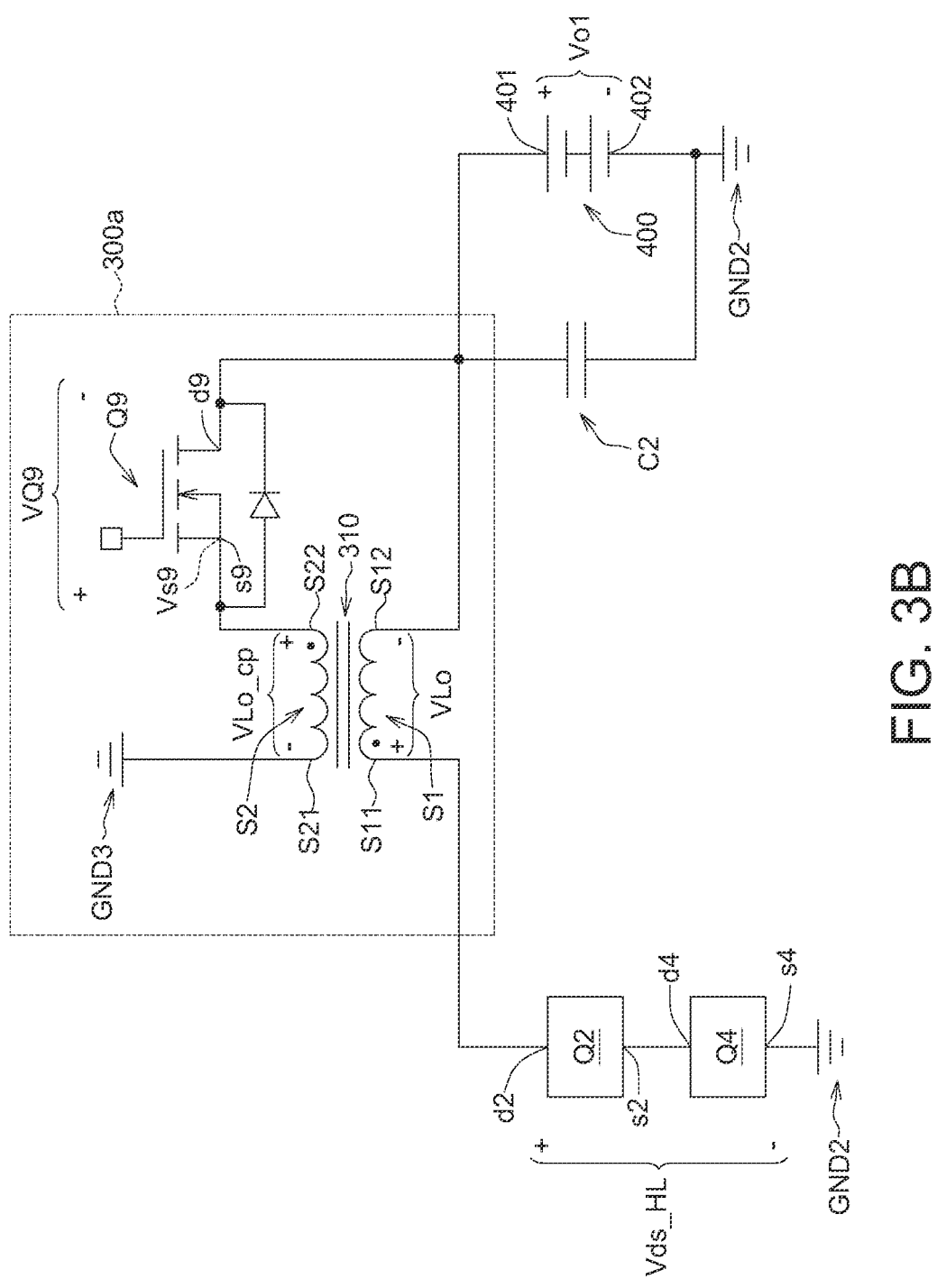
FIG. 3B is a detailed circuit diagram of the coupling circuit 300*b* of FIG. 3A.

FIG. 3B is a detailed circuit diagram of the coupling circuit 300b of FIG. 3A. Please refer to FIGS. 3A and 3B, the coupling circuit 300a comprises a winding coil S1, a winding coil S2 and a transistor Q9. The second end S22 of the winding coil S2 is connected to one end of the capacitor C2 and the first end 401 of the second power supply 400 through the transistor Q9. The second end S22 of the winding coil S2 is connected to the source s9 of the transistor Q9, and the drain d9 of the transistor Q9 is connected to one end of the capacitor C2 and the first end 401 of the second power supply 400.

The potential Vs9 of the source s9 of the transistor Q9 is equal to the voltage difference VLo_cp of the winding coil S2, and is equal to the product of the voltage difference VLo of the winding coil S1 and the turns ratio TNS_R, as shown in Equation (4):

$$Vd9 = VLo\_cp = VLo \times TNS\_R \qquad (4)$$

When the turns ratio TNS_R of the winding coil S1 and the winding coil S2 is set as an appropriate value, and the product of the voltage difference VLo of the winding coil S1 and the turns ratio TNS_R meets the predefined condition, thereby making the potential Vd9 of the drain d9 of the transistor Q9 meets a condition for turning on the transistor Q9, transistor Q9 can be turned on to guide surge energy.

The surge energy is guided to the second power supply 400 through the transistor Q9 to recover the surge energy.

In other embodiments, the coupling circuit of the power conversion circuit may use other forms of rectifying elements than the diode D1 in FIG. 2B and the transistor Q9 in FIG. 3B, such as other forms of switching elements.

In the embodiments of FIGS. 2A, 2B, 3A, and 3B, the coupling circuits 300a and 300b are disposed in the secondary side circuit 1020 and are associated with the secondary side of the transformer 200. The secondary side can be the high voltage side or the low voltage side. When the turns ratio TNP_R of the winding coil P1 and the winding coil P2 is greater than "1", the secondary side is the low voltage side. When the turns ratio TNP_R is less than "1", the secondary side is the high voltage side. In other embodiments (not shown in the figures), the coupling circuits 300a and 300b may be disposed in the primary side circuit 1010, which is associated with the primary side of the transformer 200. Moreover, in other embodiments (not shown in the figures), the transistors Q1 to Q4 and the transistors Q5 to Q8 providing switching functions may be other forms of switching elements. In addition, the power conversion circuits 1000a and 1000b can operate actively in duplex directions, and have current-feeding capabilities.

Figure 4:
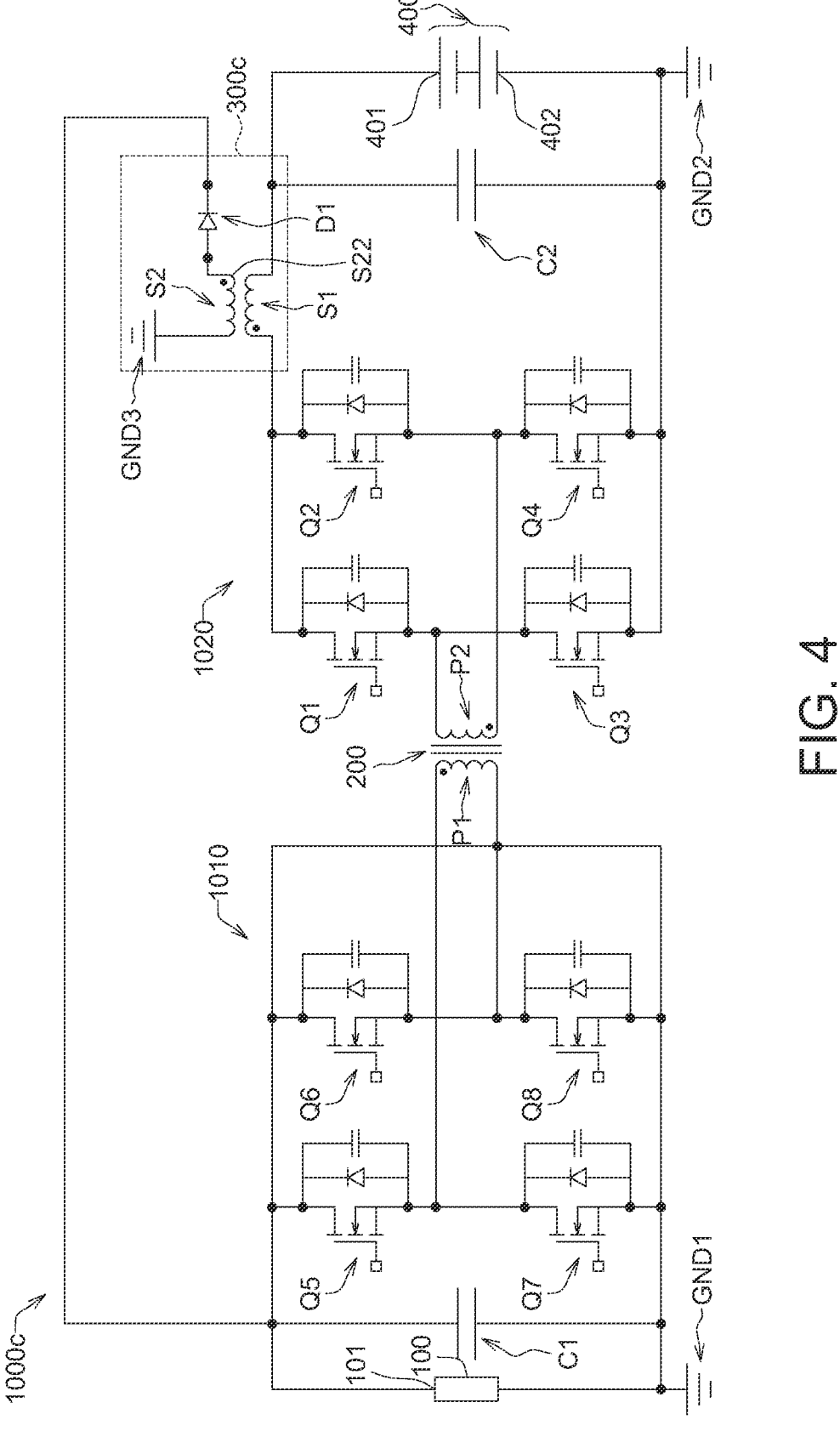
FIG. 4 is a circuit diagram of a power conversion circuit 1000*c* according to yet another embodiment of the disclosure.

FIG. 4 is a circuit diagram of a power conversion circuit 1000c according to yet another embodiment of the disclosure. The power conversion circuit 1000c in FIG. 4 is similar to the power conversion circuit 1000a in FIG. 2A, with the difference lies in that, the coupling circuit 300c of the power conversion circuit 1000c in FIG. 4 has a different connection method.

As shown in FIG. 4, the second end S22 of the winding coil S2 of the coupling circuit 300c is connected to the first end 101 of the first power supply 100 through the diode D1 (the first end 101 is the positive end). The second end S22 of the winding coil S2 is connected to the anode of the diode D1, and the cathode of the diode D1 is connected to the first end 101 of the first power supply 100. The first power supply 100 is a voltage source. Therefore, in this embodiment, "clamping limitation" can be performed by the first power supply 100.

Through the above embodiments, the power conversion circuits 1000a and 1000b of the present disclosure can guide the surge energy associated with the surge voltage to the second power supply 400 through the coupling circuits 300a and 300b, so as to recover the surge energy. Compared with the energy loss that occurs when the snubber circuit 600 of the prior art handles surge energy, the coupling circuits 300a and 300b of the present disclosure can recycle the surge energy to the second power supply 400, hence the energy loss can be to significantly reduced. Moreover, through the connection between the coupling circuit 300c and the first power supply 100, the power conversion circuit 1000c of the present disclosure achieves an effect of "clamping limitation".

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:
1. A power conversion circuit, comprising:
a first transformer, comprising a first winding coil and a second winding coil;

a primary side circuit, connected to the first winding coil, the primary side circuit comprising a first power supply and a plurality of first switching units; and a secondary side circuit, connected to the second winding coil, the secondary side circuit comprises a second power supply, a plurality of second switching units and a coupling circuit, wherein the coupling circuit comprises a third winding coil, a fourth winding coil and a rectifying element, and the rectifying element is a diode having an anode connected to a ground end through the fourth winding coil and having a cathode connected to an output end of the second power supply, wherein when one of the first switching units and the second switching units generates a surge voltage, a surge energy associated with the surge voltage is guided to the second power supply through the coupling circuit.

2. The power conversion circuit according to claim 1, wherein the first switching units are connected to the first winding coil in a full-bridge configuration, and the first power supply is connected to the first winding coil through the first switching units.

3. The power conversion circuit according to claim 1, wherein the second switching units are connected to the second winding coil in a full-bridge configuration, and the second power supply is connected to the second winding coil through the second switching units.

4. The power conversion circuit according to claim 1, wherein the first winding coil and the second winding coil have a first turns ratio, and according to the value of the first turns ratio, the primary side circuit is associated with a low voltage side or a high voltage side, and the secondary side circuit is associated with the high voltage side or the low voltage side.

5. The power conversion circuit according to claim 1, wherein the primary side circuit further comprises a first capacitor, the first capacitor is connected to the first power supply in parallel, and the secondary side circuit further comprises a second capacitor, the second capacitor is connected to the second power supply in parallel.

6. The power conversion circuit according to claim 1, wherein the third winding coil and the fourth winding coil form a second transformer, and one of the second switching units is connected to the output end of the second power supply through the third winding coil.

7. The power conversion circuit according to claim 6, wherein the fourth winding coil is connected to the output end of the second power supply through the rectifying element, and the surge energy is guided to the output end of the second power supply.

8. The power conversion circuit according to claim 1, wherein the third winding coil and the fourth winding coil have a second turns ratio, and two ends of the third winding coil have a voltage difference, when a product of the voltage difference of the third winding coil and the second turns ratio meets a predefined condition, the rectifying element is turned on to guide the surge energy to the output end of the second power supply.

9. The power conversion circuit according to claim 8, wherein two ends of the fourth winding coil have a voltage difference, and a potential of the anode of the diode is equal to the voltage difference of the fourth winding coil, the voltage difference of the fourth winding coil is equal to a product of the voltage difference of the third winding coil and the second turns ratio.

10. The power conversion circuit according to claim 9, wherein the output end of the second power supply and the ground end have a voltage difference, when the potential of the anode of the diode is greater than a sum of a forward bias voltage and the voltage difference of the second power supply, the rectifying element is turned on to guide the surge energy to the output end of the second power supply.

11. The power conversion circuit according to claim 10, wherein a first value is equal to the sum of the forward bias voltage of the diode and the voltage difference of the second power source divided by the voltage difference of the third winding coil, and the first value is less than the second turns ratio.

12. A power conversion circuit, comprising:

a first transformer, comprising a first winding coil and a second winding coil;

a primary side circuit, connected to the first winding coil, the primary side circuit comprising a first power supply and a plurality of first switching units; and a secondary side circuit, connected to the second winding coil, the secondary side circuit comprises a second power supply, a plurality of second switching units and a coupling circuit, wherein the coupling circuit comprises a third winding coil, a fourth winding coil and a rectifying element, and the rectifying element is a diode, an anode of the diode is connected to the fourth winding coil, and a cathode of the diode is connected to at an output end of the first power supply, wherein when one of the first switching units and the second switching units generates a surge voltage, a surge energy associated with the surge voltage is guided to the second power supply through the coupling circuit.

13. A power conversion circuit, comprising:

a first transformer, comprising a first winding coil and a second winding coil;

a primary side circuit, connected to the first winding coil, the primary side circuit comprising a first power supply and a plurality of first switching units; and a secondary side circuit, connected to the second winding coil, the secondary side circuit comprises a second power supply, a plurality of second switching units and a coupling circuit, wherein the coupling circuit comprises a third winding coil, a fourth winding coil and a rectifying element, and the rectifying element is a third switching unit, a first end of the third switching unit is connected to the fourth winding coil, and a second end of the third switching unit is connected to the output end of the second power supply, wherein when one of the first switching units and the second switching units generates a surge voltage, a surge energy associated with the surge voltage is guided to the second power supply through the coupling circuit.

14. The power conversion circuit according to claim 13, wherein the third winding coil and the fourth winding coil have a second turns ratio, two ends of the third winding coil have a voltage difference, when a product of the voltage difference of the third winding coil and the second turns ratio meets a predefined condition, the rectifying element is turned on to guide the surge energy to the output end of the second power supply.

15. The power conversion circuit according to claim 13, wherein two ends of the fourth winding coil have a voltage difference, and a potential of the first end of the third switching unit is equal to the voltage difference of the fourth winding coil, and the voltage difference of the fourth winding coil is equal to a product of the voltage difference of the third winding coil and the second turns ratio.

\* \* \* \* \*